United States Patent [19]
Gagné et al.

[11] Patent Number: 6,011,562
[45] Date of Patent: Jan. 4, 2000

[54] METHOD AND SYSTEM EMPLOYING AN NLE TO CREATE AND MODIFY 3D ANIMATIONS BY MIXING AND COMPOSITING ANIMATION DATA

[75] Inventors: Réjean Gagné ; Gareth John D'arcy Morgan, both of Montreal, Canada

[73] Assignee: Avid Technology Inc., Tewksbury, Mass.

[21] Appl. No.: 09/027,720

[22] Filed: Feb. 23, 1998

Related U.S. Application Data

[60] Provisional application No. 60/054,589, Aug. 1, 1997.

[51] Int. Cl.[7] ......................................... G06F 15/00
[52] U.S. Cl. ............................................... 345/473
[58] Field of Search ..................... 345/473, 474, 345/475, 121

[56] References Cited

U.S. PATENT DOCUMENTS 5,247,347   9/1993   Littgral et al. ....................... 358/85
5,442,390   8/1995   Hooper et al. ........................ 348/7
5,594,856   1/1997   Girard ................................ 395/173
5,684,918   11/1997  Abecassis ........................... 386/83

FOREIGN PATENT DOCUMENTS 0 564 247 A1   3/1993   European Pat. Off. .
WO 97/24696    7/1997   WIPO .

*Primary Examiner*—Phu K. Nguyen
*Attorney, Agent, or Firm*—Robert P. Stratton; Arne I. Fors; Mary B. Sprigings

[57]   ABSTRACT

A method and system employing an NLE to create and modify 3D animations by mixing and compositing animation data includes Actions which represent one or more animatable parameters for an animation object. The Actions are presented in an Action list from which a user may select and are positioned on an NLE-type time line for the animation object. Actions can be manipulated in a manner, which is believed to be intuitive, and is similar to the manipulation of clips in conventional NLE systems, to alter the length or speed of components of the animation and can be mixed and/or composited and otherwise manipulated to produce a desired 3D computer generated animation.

24 Claims, 6 Drawing Sheets

METHOD AND SYSTEM EMPLOYING AN NLE TO CREATE AND MODIFY 3D ANIMATIONS BY MIXING AND COMPOSITING ANIMATION DATA

This application claims benefit of Provisional Appln. 60/054,589 filed Aug. 1, 1997.

FIELD OF THE INVENTION

The present invention relates to a method and system for creating and modifying 3D animations. More specifically, the present invention relates to a system and method which employs an NLE-type user interface for mixing and compositing animation data to create and/or modify computer generated 3D animations.

BACKGROUND OF THE INVENTION

Computer generated 3D animations are well known and are increasingly used in a wide variety of applications. For example, in motion pictures such as Jurassic Park and Twister, computer 3D animations were employed to produce scenes or portions of scenes which could not otherwise be filmed. More recently, the complete motion picture Toy Story was released wherein all scenes, objects and actors were computer generated 3D animations. In other applications, computer generated 3D animations can be used to simulate or demonstrate structures and/or systems which have not yet been built for evaluation, test and/or training purposes.

As computer 3D animation systems have become more powerful, allowing the animators to produce animations which are almost indistinguishable in many cases from reality, the systems have become more complex, involving many hundreds of tools in some cases, and generating large sets of data with which the animator must interact. To achieve an animation of a desired quality, an animator must employ at least some subset of these tools and, generally, must produce the animation in an iterative manner wherein components of the animation are defined, the output of the animation is observed, the animation is then refined with one or more tools, and the new output observed. This cycle of refining and observing can be repeated hundreds of times and generally requires the animator to interact with the very large sets of data associated with the animation and its components.

In advanced animation systems, such as SoftImage|3D V3.7 sold by the assignee of the present invention, animations are defined in terms of scenes in which objects are placed. The objects can have a series of functions curves, or F-curves, associated with them to define parameters that are animated with respect to time, or another parameter, and such animated parameters can include movements, positions, speeds, scaling, colors, etc.

For example, an object can have an F-curve defined for it which establishes its position in a scene as a function of time in the animation. The same object can have another F-curve defined for it which establishes the scaling (i.e.—size) of the object as a function of the position of the object in the animation scene. These two F-curves can be used, for example, to move an animated balloon, for which the two F-curves are defined, within a scene such that the altitude of balloon changes with time and, as the altitude of the balloon increases, it's size increases too.

To define or refine an animation, an animator must define or locate the relevant F-curves and modify them as required. For many sophisticated animations, such as those employed in the above-mentioned motion pictures, hundreds or even thousands of F-curves, or their equivalents, can be commonly employed with the objects in a scene.

While such systems provide the needed degree of control of the animation, they require a high degree of training and/or skill on the part of the animator and the amount of data can be intimidating, difficult and/or time consuming to deal with. Further, when an animation has been created, it can be difficult or even impossible to reuse portions of the animation in other animations. For example, a great deal of time can be invested in animating the walk of a bipedal character in an animation yet it can be difficult or impossible to reuse the walk for another character in the same or in a different animation as each applicable F-curve must be identified, copied and re-applied to the other character.

It is desired to have a system or method of mixing and/or compositing animation data for computer generated 3D animations which does not suffer from these disadvantages.

SUMMARY OF THE INVENTION

It is an object of the present invention to provide a novel system for and method of mixing and compositing animation data to create and/or modify computer generated 3D animations which obviates or mitigates at least one of the above-mentioned disadvantages of the prior art.

According to a first aspect of the present invention, there is provided a computer implemented method of creating and modifying 3D computer generated animations by mixing and compositing animation data. A user selects an object to be animated, the object having one or more animatable parameters. The user can select one or more Actions to be applied to the object, each Action including desired animation data to animate one or more animatable parameters. An NLE-style time line is established for the object and the user positions the selected one or more Actions relative to the time line to establish when the animatable parameters are applied to the object. Actions can be created and stored for use with different objects and multiple Actions can be composited and/mixed together to obtain complex results in a simple and convenient manner. The NLE-type interface allows a user to manage large amounts of possibly complex animation data in an manner which can be more intuitive.

According to another aspect of the present invention, there is provided a system to create and modify 3D Animations by mixing and compositing animation data. The system includes a storage device to store information defining animation objects and Actions comprising animation data which can be applied to at least one of said animation objects and a computer which is connected to the storage device to access that stored information. An output device connected to said computer displays an NLE-type graphical user interface to a user and the user can employ a user input device to selection an animation object from a list representing said animation objects stored on the storage device and select at least one Action, comprising animation data that can be applied to the selected object, from a list of Actions stored on the storage device. The user then positions each selected Action relative to a time line for the animation object to define a start time and duration in which the animation data represented by the Action is to be applied to the object. The computer can then create an output representing the animation data applied to the object. The user can composite and/or mix multiple Actions for an object to obtain otherwise complex animations and effects can be applied to Actions or to durations of the animation.

According to yet another aspect of the present invention, there is provided a system employing an NLE-type graphical user interface for a user to create and modify 3D Animations by mixing and compositing animation data The system provides the user with means to select at least one object to be animated and to represent a time line and at least one track associated with said object, the track extending relative to said time line. The system also provides the user with means to select one or more Actions, each representing animation data for applying to an animatable parameter of the object, and means to associate the Actions with the time line by positioning the Actions on the track. The animation data represented by the Actions is applied to an animatable parameter of the object commencing at a time and for a duration corresponding to the position and size of the Action relative to the time line.

The present invention provides a novel method and system for producing and/or modifying 3D computer generated animations with an NLE-type interface. The system and method provides for the mixing and compositing of animations and allows the creation, manipulation and use of large amounts of potentially complex data to be accomplished in a manner which is believed to be intuitive and efficient. Animation data is arranged in Actions, which can be defined, stored and modified for use in animating objects and Actions can be represented within the NLE window of the present invention as clip objects which can be manipulated much like source information clips in a conventional post production video and/or audio NLE system.

The use of Actions allows standard sets of animation data to be created and/or animation data to be reused in a relatively easy manner. The NLE-type user interface is presented to a user who can select Actions from a list of available Actions, or who can create Actions, and mix and/or composite those Actions onto a time line associated with an object, using the known and, to many users intuitive, paradigm of NLE systems.

Reuse of complex animation is enhanced by the collapsing of mixed and/or composited Actions and effects into compound or container Actions, which an animator can reuse as desired, either by merely copying and repositioning with respect to a time line or by copying and then expanding the compound or container Action to re-mix, re-composite or otherwise modify its components, as desired.

Mixing of Actions allows a user to combine Actions to obtain new results. For example, an Action representing an arm waving motion can be mixed with an Action representing a wrist-twisting motion to obtain a motion wherein the arm waves while the wrist is twisted. Further, transitions between Actions can also be provided. For example, an Action representing a walk to be applied to a character and an Action representing a run to be applied to a character can be mixed by the present invention to obtain a smooth transition between the different motions.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
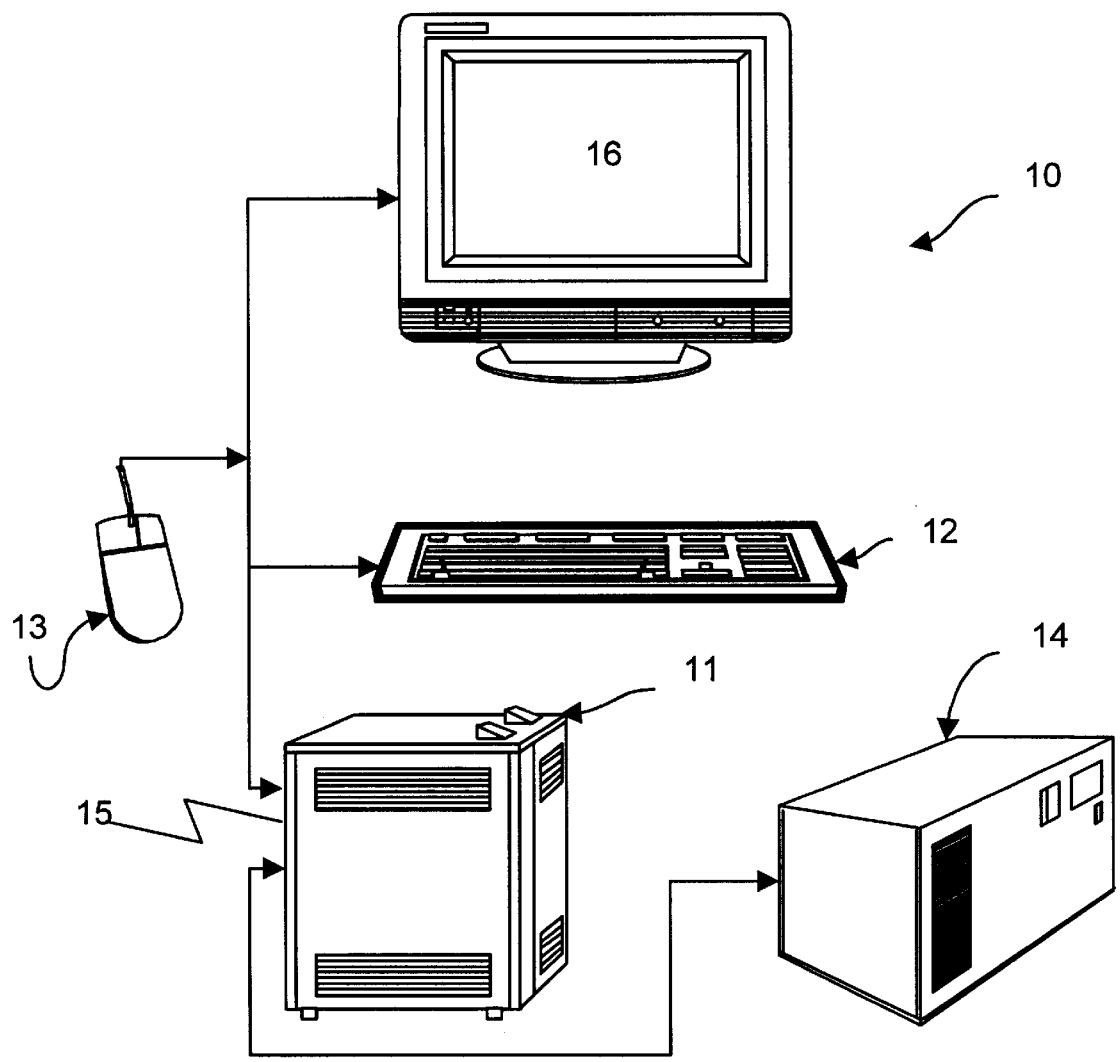
FIG. 1 shows a representation of an animation mixing and compositing system in accordance with the present invention.

FIG. 1 shows an example of an animation mixing and compositing system 10 in accordance with an embodiment of the present invention. System 10 includes a computer which, for example, can be a general purpose computer system 11 such as a PC with an Intel Pentium processor and executing Microsoft Windows NT, or a special purpose computer system, and which execute a series of program steps to provide mixing and compositing of computer generated animations. Computer system 11 is connected to one or more user input devices, such as keyboard 12, mouse 13, or any other suitable user input device such as a graphics tablet (not shown), etc. While computer system 11 will generally include a non-volatile storage device, additional data storage can be provided by a storage device such as RAID array 14, optical disc drives (not shown), etc.

As will be apparent to those of skill in the art, computer system 11 can be directly connected to storage devices, such as RAID array 14, and/or be connected to storage devices via a suitable communications link, such as LAN network connection 15, via the internet, etc. System 10 also includes one or more output devices, such as high resolution monitor 16. In the embodiment of FIG. 1, the graphical user interface (GUI), described further below, of the animation and compositing system and the outputs of the animation being produced are each displayed, either simultaneously or alternately, on monitor 16. It is also contemplated however, that in some circumstances more than one monitor 16 may be provided to allow output to be displayed on one or more monitors while the GUI of the animation and compositing systems is displayed on another.

In the above-mentioned SoftImage|3D V3.7 system, most animations are defined and modified by keyframing. Specifically, the animation data comprises a model or object which is placed into a first state (location, orientation, color, etc.) at a first time, and is then stored as a keyframe. The model or object is then placed in a second state at a second time which is stored as the next keyframe, the keyframes forming part of the animation data. SoftImage|3D determines each frame of the animation between the two stored keyframes by interpolation to obtain the complete animation. For each time-changing parameter associated with the animation, the parameter is displayed in the F-curve editor for the keyframes and is interpolated for the remaining frames from the F-curve which the animator can manipulate to change the parameter with respect to time.

For example, a position versus time F-curve can be modified such that an object moves with a linear or a non-linear speed, as desired by deleting, storing and/or repositioning keyframes and interpolation parameters with respect to the time axis in the F-curve editor. While this allows good control over an animation, it can be tedious and/or can require a large amount of effort on the part of the animator as, for example, defining a walk sequence for a bipedal character may require hundreds of keyframes on hundreds of F-curves and a good deal of direct manipulation of the resulting F-curves to obtain a realistic motion.

The present invention employs two concepts to overcome the disadvantages of the prior art, the first being the concept of Actions and the second being the use of an NLE-type interface for mixing and compositing the animation data for the 3D animations. As used herein, compositing is intended to comprise both its conventional meaning, wherein animated objects and backgrounds are layered together to obtain a final rendered animation, and what the present inventors refer to as the compositing of animation data, wherein one or more Actions, transitions, effects, etc. is applied to an object.

Actions are sets of animation data information which can be applied, or "composited" to one or more animatable parameters of an object or model, as described in more detail below. At their simplest, Actions can correspond to an F-curve and at their most complex, Actions can comprise a container of multiple, interrelated animation data sets. Actions allow an animator to create, store and reuse animation information in a simple and effective manner.

A simple Action represents data relating to an animatable parameter of an object and can comprise F-curve, shape or deformation information which is to be composited to an object. As used herein, the term object is intended to comprise animation data representing an animatable component of a 3D animation, such as geometric volumes, articulated objects, chain hierarchies, etc. Actions can generally be composited onto objects of similar topologies, as will be discussed below in more detail, allowing reuse of an Action on different objects and Actions can be composited to one or more objects as desired. For example, an Action comprising a position which changes with time (i.e.—an animated translation) from a first position to a second position can be composited to a cube object, a sphere object, etc.

In addition to simple Actions, the present invention further includes compound Actions which can contain two or more simple Actions. In fact, by default all data relating to animatable parameters of an object are stored as simple Actions in a compound Action. As described below, a compound Action can be expanded to access the simple Actions contained therein, the simple Actions being arranged in a hierarchy based on the topology of the object for which the compound Action is defined. Simple Actions in a compound Action can be edited, cut and pasted within the compound Action and between compound Actions, if desired.

The present invention further includes container Actions which, like compound Actions, can contain simple Actions and which can also contain transitions, effects, compound Actions and other container Actions, as described in more detail below. As will be apparent, simple Actions, compound Actions and container Actions can all be composited onto various objects, as desired.

Figure 2:
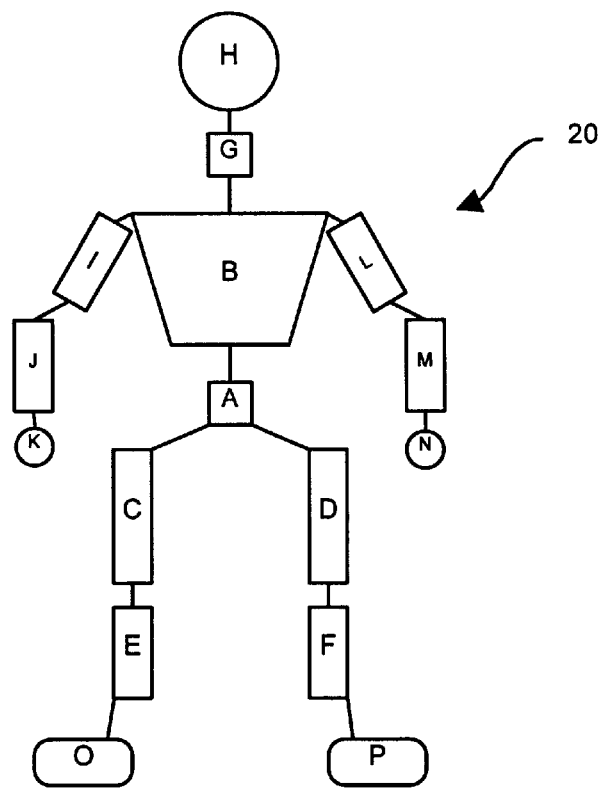
FIG. 2 shows a schematic representation of an object for use with the present invention.

In FIG. 2, a representation of an animation object 20, in this case a bipedal character, is shown wherein object 20 comprises elements identified as "A" through "P" which can be animated. Object 20 can be implemented as a hierarchy of articulated chains and associated envelopes, flexible or otherwise, and constructed in a known manner or can be any other object such as a geometric volume, etc. In the illustrated case of the articulated chain hierarchy, elements A through P can be joints in the articulated chains and the character can be animated by changing the rotations of the joints, or the positions of the end effectors, over time.

Figure 3:
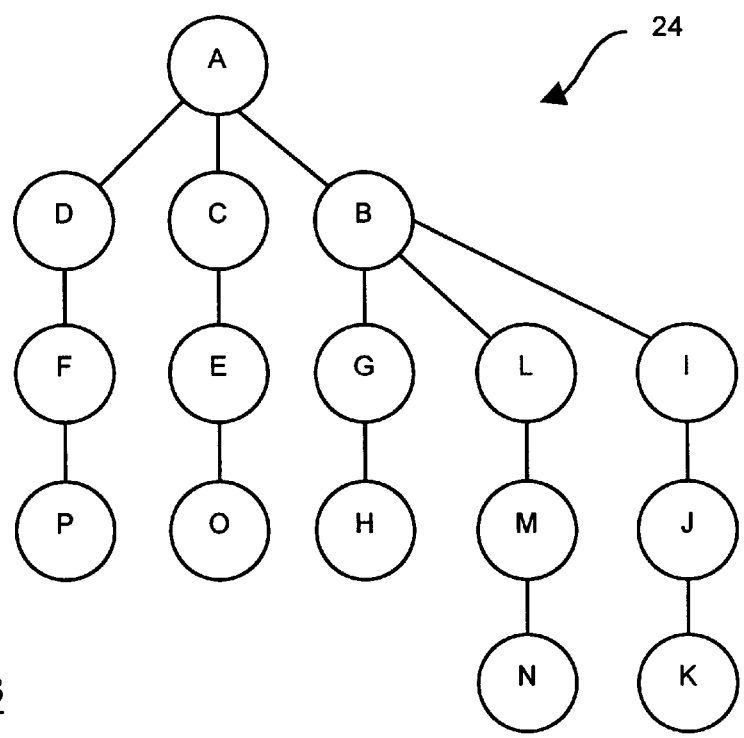
FIG. 3 shows the element hierarchy of the object of FIG. 2.

FIG. 3 shows an example hierarchy 24 derived from object 20 wherein hierarchy 24 corresponds to the topology of object 20, for example the elements of the left leg (D, F and P) comprise a branch of hierarchy 24.

It is contemplated that various portions of the hierarchy can have defined names which allow an Action defined for one object to be composited to another object which has a similar topology in at least a portion of the object. For example, the branch of hierarchy 24 containing nodes D, F and P can be defined as "left leg" and the branch containing nodes C, E and 0 can be defined as "right leg". An Action which is defined for object 20 to animate a walk for the character can also be employed with any other object with a bipedal structure with branches defined as "left leg" and "right leg", with the appropriate animated parameters being assigned to corresponding elements in the other object.

Figure 4:
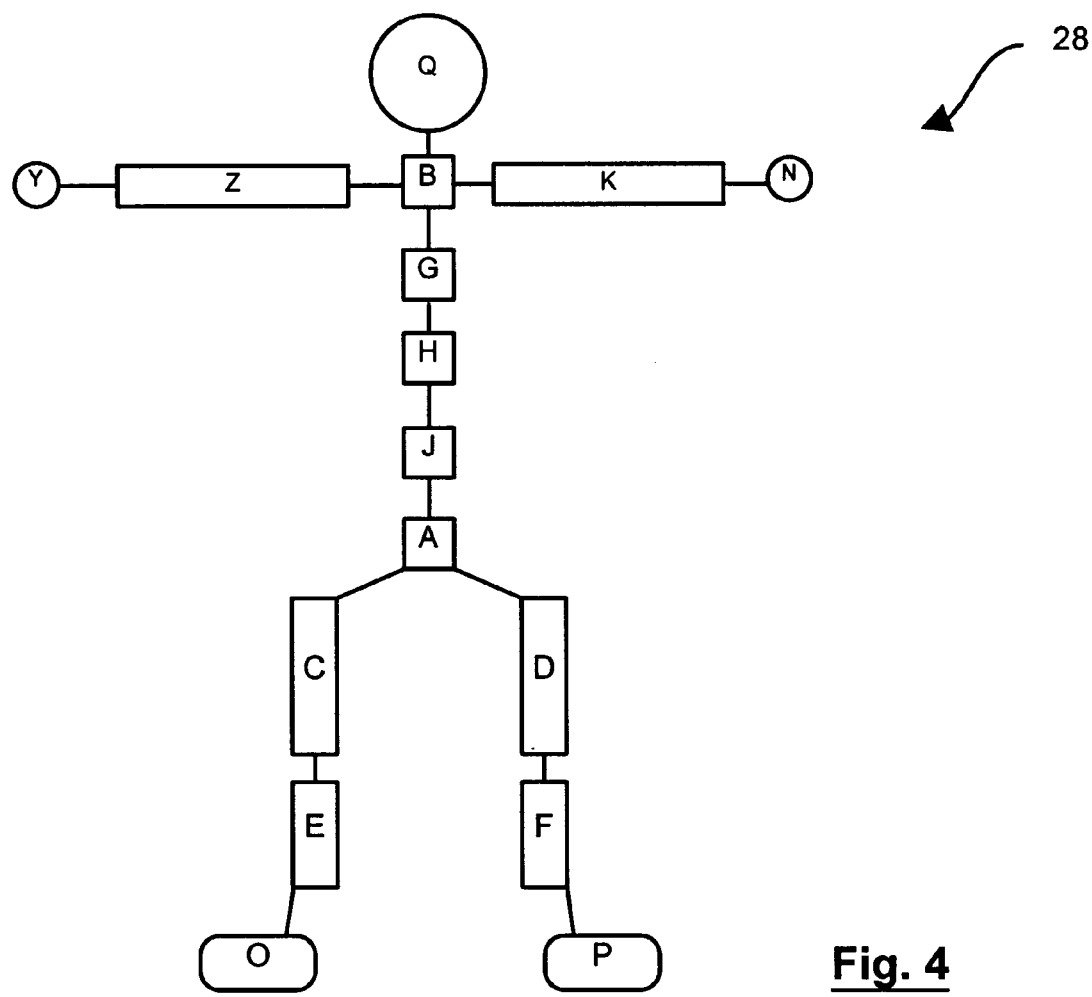
FIG. 4 shows a schematic representation of another object for use with the present invention.

For example, FIG. 4 shows another bipedal object 28 with a different torso structure but with the same structure for the "right leg" and "left leg". Any Action defined for object 20 to animate the legs can also be composited to object 28. As will be apparent to those of skill in the art, if the proportions of the legs of object 28 are significantly different than those of object 20, the results obtained from the compositing can require modification before they are useful.

Further, when an Action is composited to an object, it only affects those portions of the object to which it is mapped. For example, compositing the Action which animates the walk of object 20 to object 28 will result in the legs of object 28 being animated as desired, but will not animate the arms or torso of object 28. Another Action, either predefined or defined as required, can also be composited to object 28 to animate the torso and/or arms of the object. In this manner, various Actions can be composited to an object by an animator to build up a complex motion for the object, as desired.

Actions can define an animated parameter as a repeating, or repeatable, cycle. For example, Actions defined to animate the walking or running of a bipedal object can be repeated in a cyclic manner to provide an animation of any desired length.

Actions can be created in a variety of manners. For example, if an Action to animate a bipedal character represented as a hierarchy of articulated chains and flexible envelopes is to be created, appropriate portions of the hierarchy are assigned appropriate, and preferably predefined names. It is contemplated that animators working on a animation will agree on the definition of portions and names of types of characters and/or objects prior to the commencement of work on the animation, to enhance the reuse of Actions within an animation. Preferably, these definitions will be used across animations, allowing animators to construct and use a library of Actions over time. Thus, a standard definition will exist and be named for categories of characters and objects such as bipedal characters, quadruped characters, etc. and/or for such characters and objects with different proportions, i.e. "bipedal long limbs", "quadruped short limbs", etc.

Once the desired portions of the character hierarchy have been identified and named, animation of the character proceeds in much the same manner as a conventional animation process, with the animator positioning the effectors of articulated chains, etc. and keyframing the positions. When the Action yields a desired result, such as the change of a character's facial expression or a bipedal walk motion, the Action is saved to an Action list with a suitable identifier, such as "frown" or "walk". Saved Actions can subsequently be accessed from the Action list by animators, as described below.

In the present invention an Action can be saved independently of the particular character or object with which it is created. Of course, the Action can be applied to the character or object with which it was created but it can also be applied to any other character or object with a similar topography. An animator can also apply an available Action to a character or other object and then tweak it specifically for that character, by editing the underlying F-curves or other animation data for the Action in manner much like the conventional editing of animation data. The resulting tweaking Action is then saved as a new Action and this allows an animator to start with a generic Action, such as a bipedal walk, and modify it to obtain a unique animation for the character, such as a distinctive walk.

In a similar manner, motion capture information can be saved and/or edited as an Action, or as a series of more Actions, provided that the motion capture points are assigned to relevant named portions defined for a character or object.

An Action list is provided which lists all Actions available within an animation. The list can include generic Actions, such as bipedal walk and run Actions, and specific Actions for each object in an animation. The Action list contains all of the Actions, simple, compound or container, which are available for compositing onto objects in an animation. The Actions in the Action list can be selected and composited to objects in the NLE-based mixer and compositor, as described below.

The separation of animations into objects and Actions applied to those objects is believed to provide significant advantages over prior art animation techniques by providing animators with an improved mechanism for dealing with the large quantities of data associated with an animation and by enhancing the ability of an animator to create, store, manipulate and/or reuse animation information independent of specific objects.

The present invention employs an animation mixer and compositor which utilizes Actions and an NLE-type interface to define and modify animations. NLE (non-linear editing) systems are well known for 2D data, such as digital video, and 1D data such as audio, and generally employ a time line-based metaphor wherein components of an edit are arranged along a time line to obtain a desired final edit. To date, NLE-type systems have been employed as a post production facility whereby 1D or 2D source information, produced in conventional manners, is edited down to obtain a final "cut" or edit. In contrast, the present inventors have determined that an NLE-type interface provides a unique and useful paradigm for creating, mixing, compositing and otherwise manipulating 3D source information. In particular, the present invention is believed to be particularly advantageous for the creation of 3D computer generated animations by mixing and/or compositing Actions with various objects.

Figure 5:
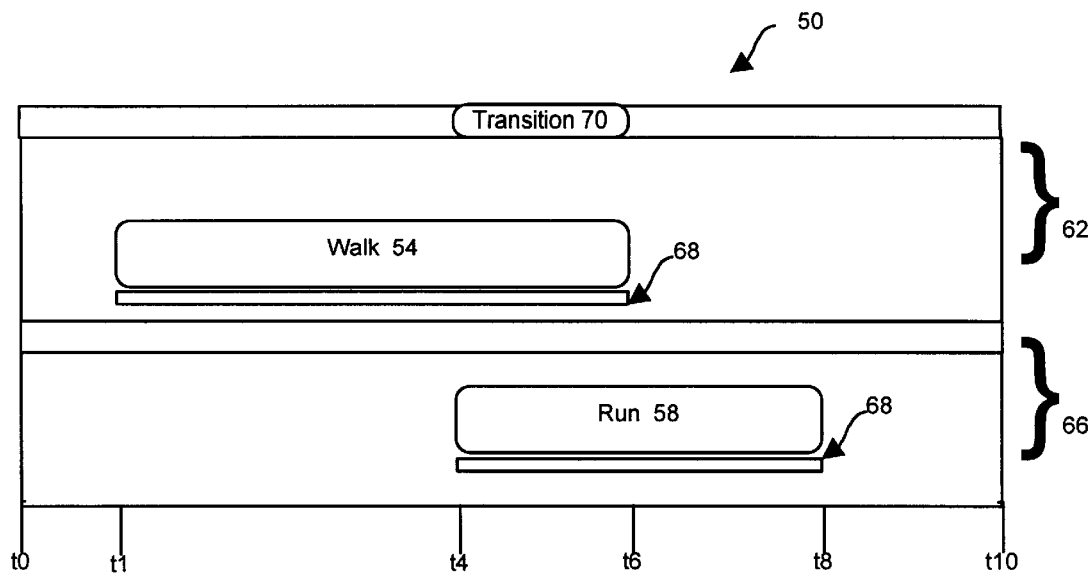
FIG. 5 shows a portion of an NLE time line for use with the present invention.

FIG. 5 shows a schematic representation of an NLE-type mixer and compositor in accordance with the present invention. In the Figure, a ten second time line 50 has been defined for an object, for example object 20 of FIG. 2, and two Actions, represented by clip icons 54 and 58, have been applied to the object, each in its own track 62 and 66. In this example, the Action represented by clip icon 54 is a "walk" Action which has a duration from time t1 to t6 and the Action represented by clip icon 58 is a "run" Action which has a duration from time t4 to t8. Duration times within a time line are not absolute but are relative to the start of the time line which can be positioned anywhere within a final animation cut which incorporates time line 50. For example, t0 in time line 50 can occur at t100 in the final cut, and t4 in time line 50 will then occur at t104 in the final cut.

Similarly, time within a clip, such as Action clip 54, is relative to where the clip is located relative to the time line of the NLE for the object and/or animation. If the Action represented by Action clip 54 defines that a bipedal character's right foot executes a kick two seconds after the Action commences, then locating clip 54 within the time line of the NLE such clip 54 commences at t1 results in the kick commencing at t3.

Figure 7:
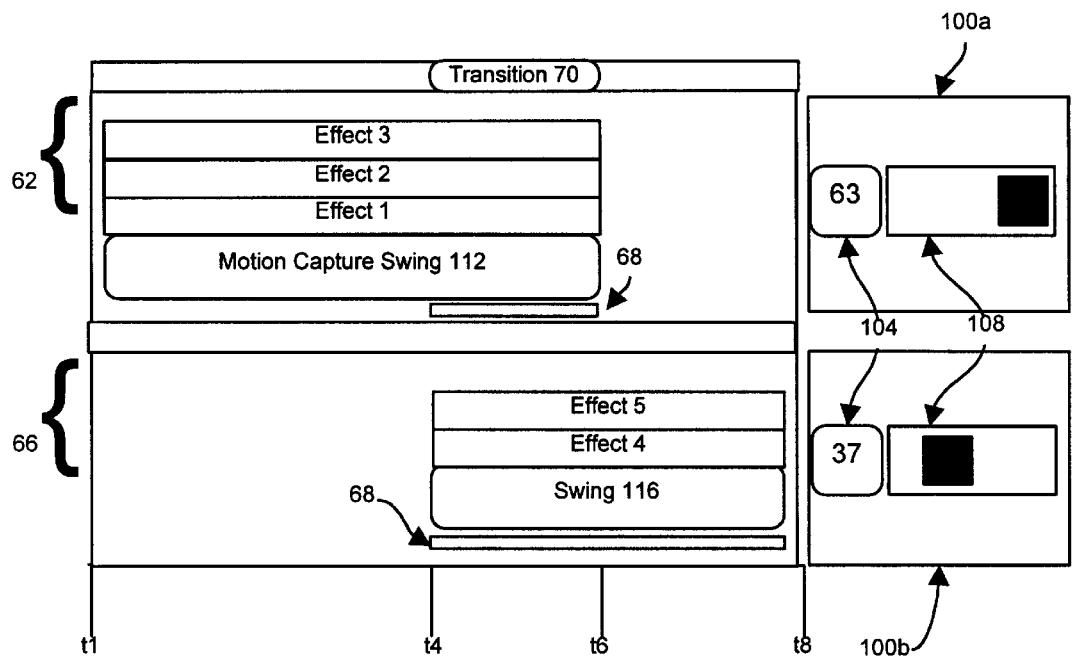
FIG. 7 shows another NLE time line for use with the present invention.

Each track also has associated with it one or more indicators, such as active bars 68, whose presence indicates, and allows a user to define, when the Action represented by a clip icon is contributing to the final animation. Active bars 68 can be applied to the total duration of an Action, as shown in this Figure, or to only one or more portions of an Action, as is shown in FIG. 7, described below. When an Action is placed in a track, an active bar 68 is associated with it and, by default, the total duration of the Action is selected and this can be altered, as desired, by a user through any suitable GUI operation, such as clicking and dragging with mouse 13 on an end of an activity bar 68 to alter its length, or clicking and dragging on the middle of an activity bar 68 to reposition it relative to the total duration of the Action.

Actions can be non-overlapping or overlapping, as defined below. Non-overlapping Actions are those which are not applied to the same animatable parameters at the same time. For example, an Action which animates object 20 to wave its hand is non-overlapping with an Action which animates object 20 to turn its head, as these movements/animated parameters affect different components of the object (neck vs. hand and arm) and do not conflict. Non-overlapping Actions can be placed on a single track, or on separate tracks, at the desired location. In the above-mentioned example of hand waving and head moving Actions, the two Actions can be placed adjacent each other on a single track in the mixer and compositor, with the desired order and relative durations. In this case, object 20 can perform first one Action and then the next, for example turning its head and then waving.

It can also be desired to simultaneously perform two or more non-overlapping Actions, for example it may be desired for object 20 to both turn its head and to wave at the same time. In such a case, the Actions are each placed on a separate track and the mixer and compositor composites the Actions together as appropriate.

Overlapping Actions are those which apply to at least some of the same animatable parameters of an object at the same time. For example, the walk Action represented by icon 54 can overlap with the run Action represented by icon 58, if the animator desires a smooth transition therebetween, as each Action animates the legs of the object for at least some common time period and thus, there must be a transition from the walking motion to the running motion. In such cases, the Actions are placed on separate tracks and the mixer and compositor "mixes" the Actions by producing an appropriate transition to mix between the two or more Actions.

In FIG. 5, a Transition 70 is applied onto the overlap, between times t4 and t6, of the durations of the walk Action represented by icon 54 and the run Action represented by icon 58 and defines that a transition is to be created by the mixer and compositor such that object 20 transitions (mixes) from a walking motion to a running motion in the two second overlap (t4 to t6). As is apparent to those of skill in the art, the automatic generation of such transitions is not generally a simple manner but one technique for determining such transitions is discussed in "Efficient Generation of Motion Transitions Using Spacetime Constraints", Rose et al., ACM Computer Graphics Proceedings, Annual Conference Series 1996, pages 147 to 154, the contents of which are incorporated herein by reference. While such automatically generated transitions may not always produce exactly the result desired, they can provide a reasonable first approximation which an animator can subsequently modify as desired.

Figure 6:
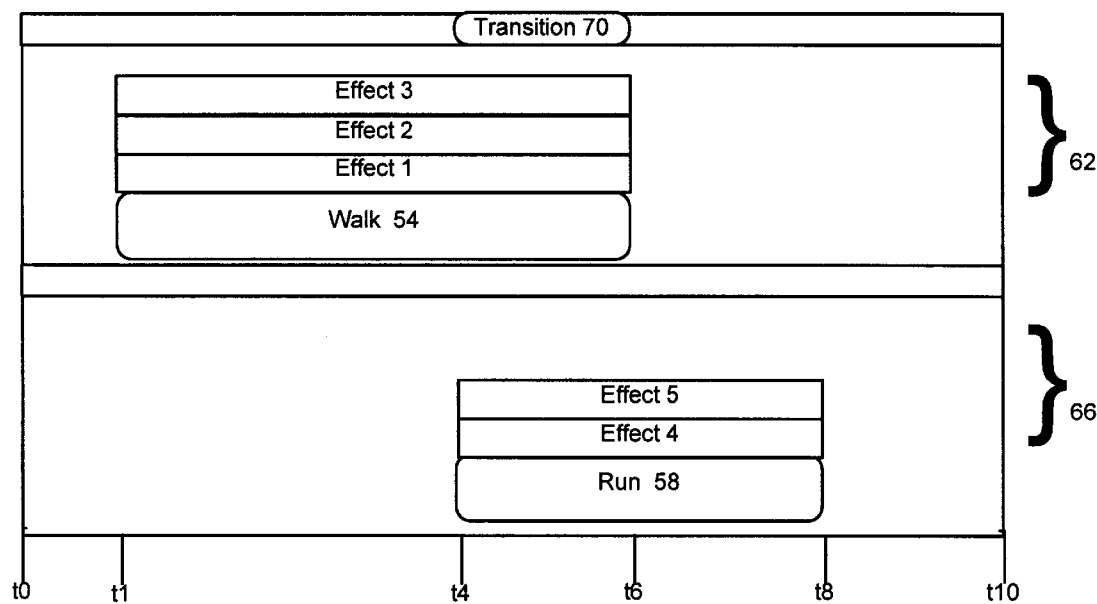
FIG. 6 shows the portion of the time line of FIG. 5 with various effects applied.

In addition to Actions and Transitions 70, various effects can be employed within the mixer and compositor in accordance with the present invention. FIG. 6 shows the example of FIG. 5 wherein a variety of effects have been composited onto the animation. As shown, the present invention provides for two categories of effects, namely a clip effect and a time line effect. Clip effects, such as Effects 1 through 5 in FIG. 6, are applied to Actions and are performed relative to the start time of the Action to which they are applied. The range of effects which can be applied is quite broad and includes effects such as "clamp" effects, which prevent specified animation values from exceeding predefined maximum values, "warp" effects which can alter the time scale of the Action in a non-linear manner, etc. In contrast, a time line effect is applied to a time line for a selected duration and affects all of the components of the animation which are active during that duration. Time line effects are defined relative to the start time of the animation's time line, rather than the start time of the Actions, and could for example be a jitter effect which is applied to the time line to represent the effect of an earthquake, with the result that all of the active objects in the animation shake on the animation within the duration of the earthquake.

In a mixer and compositor in accordance with the present invention, Actions can be manipulated within the NLE-type interface to define and/or modify an animation in a simple, yet powerful manner which users can find to be very intuitive. For example, in the example of FIG. 5, the animator can interactively alter the size of icon 54 to correspondingly alter the duration of the walk Action it represents. Resizing an icon can have two or more different results, depending upon the underlying Action and the desire of the animator.

Specifically in a first mode, with cyclical Actions depicting repetitive events, the icon representing the Action can be resized to increase the total duration in which the Action is performed. As with active bars 68, Actions can be resized and/or repositioned via any suitable GUI operation or other input. For example, an Action can be resized by clicking and dragging with mouse 13 on the left or right side of the icon for the Action to lengthen or shorten the duration of the Action and clicking and dragging the center of the Action can be employed to reposition the Action relative to the time line.

If lengthened, the object can perform more cycles than before. If shortened, the object can perform fewer cycles than before. For non-cyclical Actions, such as a translation Action, the Action can be defined with a default operation and, when the duration of the Action is lengthened in this mode, the Action is extended by adding additional frames of the default operation. For example, in a translation Action wherein an object moves from a first defined position to a second defined position by a straight line path, the default operation may be to continue moving along the straight line path. In such a case, resizing the Action in this mode will result in the object moving from the first position toward and eventually past the second position in accordance with a predefined set of end constraints. If the Action is shortened, the object will move from the first position toward the second position, but will not reach the second position.

In a second mode, the Action icon can be re-sized to alter the speed with which an Action is performed. In the case of a cyclical Action, the object performs the same number of cycles as before, but over a longer or shorter period of time, effectively being a slower or faster animation. In the case of a non-cyclical Action, the result is much the same with the same animation occurring at a slower or faster pace, i.e.— moving from a first position to a second position in five seconds or in ten seconds.

Selection of which mode is to be employed can either be inherent, as some Actions may only support one or the other mode, or can be defined in a variety of manners, such as by employing different mouse keys or by pressing and holding a modifier key (such as an ALT or CTRL key) while performing the re-sizing with mouse 13.

As will be apparent to those of skill in the art, an Action can also be copied one or more times and the copies employed within the mixer and compositer as desired. For example, multiple copies of an Action can be placed adjacent one another in a track to repeat the Action, much like a cycle.

Essentially, in the present invention a clip object is responsible for knowing how to produce the output desired by the user. Suitable messaging between the mixer and compositor and a renderer and/or conventional editing tools is provided. If an animator requires access to the underlying animation data (such as an F-curve, etc.) or object data (such as the definition of an articulated chain, etc.), a suitable editor tool can be invoked via the NLE, by double-clicking on the Action icon or time line, respectively. The animation data or object data can then be modified, as desired, using the invoked conventional tool, and the modified data can replace existing data or can be saved as new data, as desired.

The mixer and compositor of the present invention supports other NLE-type operations, such as cut and paste between compatible Actions, collapsing portions of the time line to an iconic representation to permit viewing of the remaining portions of long time lines, deletion of Actions and/or effects, and the activation and/or inactivation of tracks. In the latter case, an animator can inactivate all tracks or Actions but one, for example, to see the result of the remaining track and/or Action or can inactive one or more tracks or Actions to determine their effect on the animation. Further, compound Actions and/or container Actions can be expanded to allow access to their contents.

As shown in FIG. 7, each track 62, 66 etc. of the mixer and compositor in accordance with the present invention includes a mixer control 100 associated with the track. Each mixer control 100 can include a numeric control 104 indicating the present mix value of the mixer, and allowing direct numeric input by a user to modify the mix value, and a slide control 108 allowing modification of the mix value by the user sliding the control appropriately.

Mixer control 100 defines the contribution of the contents of the associated track to the final animation. Mixer control 100 is not limited to simply compositing the final animation, but can also set the relative contributions in the mix of overlapping Actions applied to an object. For example, in FIG. 7 two overlapping Actions, Motion Capture Swing 112 and Swing 116, have been defined for an object, such as object 20. Motion Capture Swing 112 Action comprises information relating to a professional baseball player's swing at a baseball which has been obtained via conventional motion capture techniques. Swing 116 Action comprises a swing at a baseball produced through the efforts of a skilled animator. It can be the case that the Motion Capture Swing 112 Action, despite being accurate, does not meet the requirements of the animator. In such a case, these two Actions can be mixed and the resulting mix performed by object 20 to modify the resulting swing by object 20. Accordingly, mixer controls 100*a* and 100*b* allow a user to specify the contribution of each Action to the mix until the desired result is obtained.

For example, as shown in the Figure, Motion Capture Swing Action 112 has a mixing value of 63 while Swing Action 116 has a mixing value of 37. In this example, the mixing can be accomplished by interpolating the positions of the swings with a relative weightings according to the mixing values. In more complex cases, such as walk to run transitions, etc. discussed above, appropriate mixing strategies are employed and incorporate the user defined mixing values appropriately.

As will be apparent to those of skill in the art, mixer controls 100 can operate in additive, averaging or any other desired mode, including delta, absolute, etc. as desired and/or appropriate and can be employed to mix more than two Actions, if desired.

Further, as discussed above, FIG. 7 shows the active bar 68 associated with Motion Capture Swing 112 being arranged such that this Action is only active for a portion of its full duration. The inactive portion of the Action can, for example, represent one or more practice swings taken by the baseball player prior to the actual swing and which are presently not of interest to the animator but which are present in the captured motion.

The present invention is not limited to animations with only one object and can be utilized to define and/or modify animations with multiple objects. When multiple objects are present, they are composited (in accordance with the conventional meaning of "compositing") according to any suitable method, such as the top to bottom ordering of the tracks in the mixer and compositor. In such a case, the tracks defined for each object are adjacent one another in the mixer and compositor and those closer to the top of the mixer and compositor NLE are composited in front of those more distant from the top. However, as will be apparent to those of skill in the art, the ordering of the compositing of objects is not limited to a top-front/bottom-back type arrangement and any other suitable arrangement, as will occur to those of skill in the art, can be employed.

Figure 9:
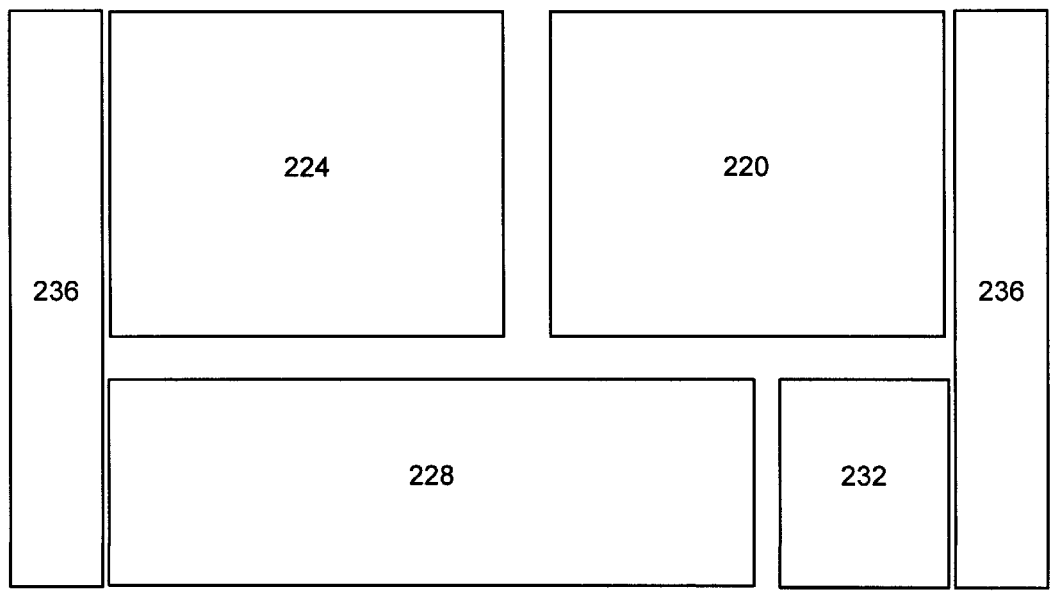
FIG. 9 shows a schematic representation of the screen display of FIG. 8.
Figure 8:
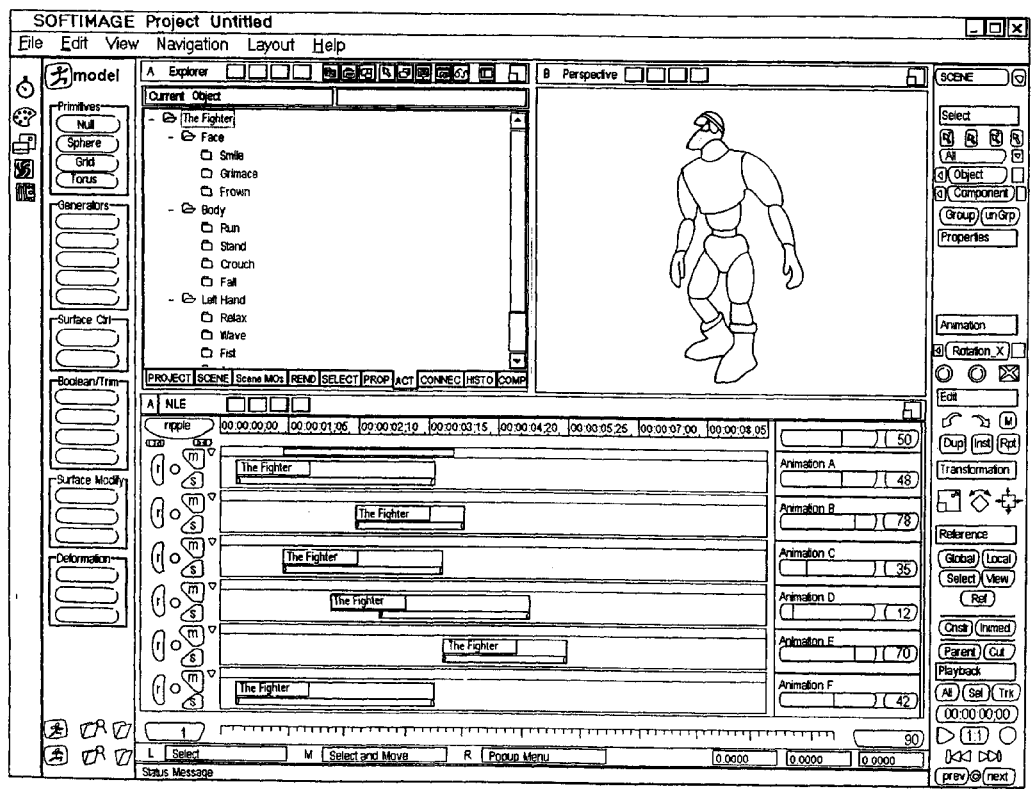
FIG. 8 shows a screen display from an embodiment of the present invention.

FIG. 8 shows a screen display from a mixer and compositor in accordance with an embodiment of the present invention. In the Figure, mixer and compositor 200 includes five major components, as indicated schematically in FIG. 9. Component 220 provides a geometry view which allows the user to identify the object which is currently active, as determined by selecting an object of interest from the Action/List Explorer component 224 which displays a tree-like hierarchy of the entire animation, including all generic Actions, if any, available to the user, all objects in the animation and available effects, etc.

As will be apparent to those of skill in the art, objects to be animated can be created in any suitable manner such as with the tools in the Model module of the above-identified SoftImage V3.7. If the definition of the object to be animated does not include a defined and/or named portion (i.e.—"left leg"), as described above, this can be added by the user via any appropriate tool. Once an object of interest is selected from the Action/List Explorer component 224, Geometry view component 220 is updated to reflect the selected object and any tracks defined for the object are displayed in the NLE time line component 228. As shown in FIG. 8, once an object is selected from the Action/List Explorer 224, the object can be expanded to show available Actions defined for that object, etc. Desired Actions for the selected object can be selected from Action/List Explorer component 224, either a generic Action (such as a biped walk) or an Action which has been previously defined for the object, and "dropped" onto a track in NLE time line component 228 for manipulation, by known GUI actions such as drag and drop, etc., as described above.

For example, in FIG. 8 the user can select the "Grimace" Action defined under the "Face" category for the "The Fighter" object and drag it to the uppermost track of the six tracks shown in NLE time line component 228. Upon dropping the Action, by releasing the mouse button for example, an icon representing the Action is placed in the track under where the drop occurred and an activity bar is created and associated with that icon. In an embodiment of the present invention, the default state of an activity bar is to make the entire Action active. The user can then reposition and/or resize the icon for the Action, select one or more portions of the total duration of the Action to be included in the compositing of the animation data by altering the activity bar and/or apply effects to the Action. Also, an appropriate mix value can be set for the track. As mentioned above, each track in NLE time line component 228 has a mixer control associated with it, the mixers for each track being located in Mixer component 232.

The example shown in FIG. 8 can represent a container Action which is being defined by a user to animate a kick motion by the The Fighter. As mentioned above, the first track can represent a facial expression for the The Fighter object as he executes the kick, while the second through fifth tracks can represent a body stance ("Stand" Action), a "Fist" Action for the left hand, a "Kick" Action (not shown in the Figure) for the left leg, etc. Once the container Action has been created, observed and/or refined to the satisfaction of the user, it can be stored for subsequent reuse. For example, a "Save as Container Action" menu item can be selected from the drop down File menu shown at the top of FIG. 8 and an appropriate name assigned to the Action. Once saved, the Action will be added to the list of Actions for the The Fighter object in Action/List component 224.

In an embodiment of the present invention, by default component 220 displays a geometry rendering of the current state of the object being composited and mixed. This rendering can be updated, in real time if desired, to reflect modifications made in NLE timeline component 228 or updates can be performed only when requested by the user. Further, a rendering of the entire animation defined in NLE timeline component 228 can presented in component 220 when desired by the user.

Finally, Preset and Control components 236 allow a user to define one or more collections of frequently used components, such as filters, etc. for reuse in an easy manner and/or to access desired tools, etc.

The present invention provides a novel method and system for defining and modifying animations. The invention allows the creation, manipulation and use of large amounts of potentially complex data to be accomplished in a manner which is believed to be intuitive and efficient. Further, the use of Actions allows standard sets of animation data to be created and/or animation data to be reused in a relatively easy manner. Reuse of complex animation is enhanced by the collapsing of mixed and/or composited Actions and effects into compound or container Actions, which an animator can reuse as desired, either by merely copying and repositioning with respect to a time line or by copying and then expanding the compound or container Action to re-mix, re-composite or otherwise modify its components, as desired.

The above-described embodiments of the invention are intended to be examples of the present invention and alterations and modifications may be effected thereto, by those of skill in the art, without departing from the scope of the invention which is defined solely by the claims appended hereto.

We claim:

1. A computer implemented method of creating and modifying 3D computer generated animations by mixing and compositing animation data, comprising the steps of:
   (i) selecting with a user input means an object to be animated, said object having one or more animatable parameters and associating a time line and at least one track with said object;
   (ii) selecting with a user input means an Action to be applied to said object, said Action including animation data to animate at least one of said animatable parameters of said object; and
   (iii) applying said Action to said object in a graphical user interface produced by said computer by positioning, relative to said time line, said Action on said at least one track and said animation data being composited to said animatable parameters for a total duration defined for said Action.

2. The method of claim 1 where in step (iii) an indicator of an active duration is also created by said computer for each Action positioned relative to said time line, each said indicator being modifiable by a user to define at least one active duration in which said animation data of each said Action is composited to said object, said at least one active duration being less than or equal to said total duration and animation data of each said data outside of each said active duration being omitted from said compositing.

3. The method of claim 1 wherein steps (ii) and (iii) are repeated to composite additional Actions to said object.

4. The method of claim 3 wherein each said Action is represented on said at least one track as a clip icon, the size of said icon corresponding to the total duration of said Action.

5. The method of claim 4 wherein each said indicator comprises at least one activity bar, the position and length of said at least one activity bar relative to said clip icon of an Action indicating active durations of said Action.

6. The method of claim 3 wherein, prior to repeating step (ii), a second track is created by said computer in response to user input and is associated with said object and in step (iii) said Action selected in repeated step (ii) is applied to said second track.

7. The method of claim 6 further comprising the step of the computer creating a transition between a first Action on a track and a second Action on said second track, the animation data of said first Action and the animation data of said second Action each being applied to at least one common animatable parameter of said object, said first Action being applied for a duration which at least partially overlaps the duration of said second Action.

8. The method of claim 4 wherein when said clip icon for an Action is resized, the total duration of said Action is correspondingly changed by said computer.

9. The method of claim 8 wherein said duration is changed by said computer performing the animation at a different speed.

10. The method of claim 8 wherein said duration is changed by one of said computer adding and removing a portion of said animation.

11. The method of claim 4 wherein at least one effect is represented as an effect icon and said effect icon is associated with a clip icon, said effect represented by said effect icon being applied to the Action represented by said clip icon by said computer relative to the start time of said Action.

12. The method of claim 4 wherein at least one effect is represented as an effect icon and said effect icon is associated with a portion of said time line, said effect represented by said effect icon being applied by said computer to the portion of each Action whose active duration corresponds to said portion of said time line.

13. The method of claim 7 further comprising the step of said computer accepting input from a user representing the relative contribution of each Action to said transition and said computer weighting the compositing of the animation data of each Action accordingly when compositing said animation data to said object.

14. The method of claim 3 further comprising the step of said computer accepting input from a user representing the relative contribution of each Action to said animation.

15. The method of claim 1 wherein said Action comprises at least one f-curve defining said at least one animatable parameter.

16. A system to create and modify 3D Animations by mixing and compositing animation data, comprising:
   a storage device to store information defining animation objects and Actions comprising animation data which can be applied to at least one of said animation objects;
   a computer operatively connected to said storage device to access said information stored therein;
   at least one output device connected to said computer to display a graphical user interface to a user;
   at least one user input device connected to said computer to receive input from a user, said input:
   (a) defining the selection of at least one animation object from a list representing said animation objects stored on said storage device;
   (b) defining the selection of at least one Action from a list representing said Actions stored on said storage device;
   (c) defining the positioning of each said at least one Action relative to a time line for said animation object to define a start time and duration for each represented Action;
   (d) initiating said computer to create an output representing desired animation data to be applied to said object; and
   (e) initiating said storage device to store said output representing desired animation data.

17. The system of claim 16 wherein at least two Actions are selected and positioned relative to said time line, said input further defining a value to weight the relative contribution of each of said at least two Actions in said desired animation data produced by said computer.

18. The system of claim 16 wherein said input further modifies the duration of each said at least one Action.

19. The system of claim 16 wherein said graphical user interface includes at least two tracks and each of said at least two Actions are positioned in a different one of said at least two tracks.

20. A system employing an NLE-type graphical user interface to create and modify 3D Animations by mixing and compositing animation data, comprising:

means to select at least one object to be animated and to represent a time line and at least one track associated with said object, said track extending relative to said time line;

means to select Actions representing animation data for mapping to an animatable parameter of said object; and means to associate at least one of said Actions with said time line by positioning said at least at one Action on said at least one track such that said animation data represented by said at least one Action is composited to an animatable parameter of said object for a selected time duration.

21. The system of claim 20 wherein at least two Actions are associated with said time line and further including:

means to accept input from a user indicating the relative contribution of each of at least two Actions for compositing to said object.

22. The system of claim 21 wherein each said Action associated with said at least one track is represented by a clip icon and wherein the size of said clip icon corresponds to the length of said selected duration.

23. The system of claim 21 wherein at least first and second Actions are associated with said time line and said animation data of said first Action and said animation data of said second Action each are applied to at least one common animatable parameter of said object and further comprising means to create a transition between each of said first and second Actions.

24. The system of claim 23 further comprising user input means to accept input indicating the relative contribution of said first and second Actions for compositing together to animate said object.

* * * * *